(12) United States Patent
Park (10) Patent No.: US 11,358,548 B2
(45) Date of Patent: Jun. 14, 2022

(54) PEDESTRIAN COLLISION SENSING DEVICE

(71) Applicant: HYUNDAI MOBIS CO., LTD., Seoul (KR)

(72) Inventor: Byung Hyuk Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 182 days.

(21) Appl. No.: 16/985,958

(22) Filed: Aug. 5, 2020

(65) Prior Publication Data

US 2021/0094495 A1   Apr. 1, 2021

(30) Foreign Application Priority Data

Sep. 27, 2019   (KR) .................... 10-2019-0119636

(51) Int. Cl.
| | | |
|---|---|---|
| *B60R 19/48* | (2006.01) | |
| *B60R 19/18* | (2006.01) | |
| *B60R 21/0136* | (2006.01) | |
| *B60R 21/34* | (2011.01) | |

(52) U.S. Cl.
CPC ............ *B60R 19/483* (2013.01); *B60R 19/18* (2013.01); *B60R 21/0136* (2013.01); *B60R 21/34* (2013.01); *B60R 2019/186* (2013.01); *B60R 2021/346* (2013.01)

(58) Field of Classification Search
CPC . B60R 19/483; B60R 19/18; B60R 2019/186; B60R 21/34; B60R 2021/346; B60R 2021/0136
See application file for complete search history.

(56) References Cited

U.S. PATENT DOCUMENTS

| | | | |
|---|---|---|---|
| 8,910,986 B1 * | 12/2014 | Appukutty ............ | B60R 19/483 296/187.03 |
| 2005/0121925 A1 * | 6/2005 | Federspiel .......... | B60R 21/0136 293/109 |
| 2017/0225637 A1 * | 8/2017 | Kamimura ........... | B62D 29/008 |
| 2020/0180538 A1 * | 6/2020 | Gonzalez Laurel .... | B60R 21/36 |
| 2020/0262376 A1 * | 8/2020 | Aizawa ................. | B60R 19/483 |
| 2021/0094495 A1 * | 4/2021 | Park ..................... | B60R 19/483 |
| 2021/0268979 A1 * | 9/2021 | Yanagisawa .......... | B60R 19/483 |
| 2021/0323483 A1 * | 10/2021 | Hwang ................. | G01S 7/027 |

\* cited by examiner

*Primary Examiner* — Gregory A Blankenship
(74) *Attorney, Agent, or Firm* — DLA Piper LLP (US)

(57) ABSTRACT

A pedestrian collision sensing device may include: a bumper skin having one or more pressure sensor installation parts formed thereon; a bumper absorber disposed at a rear of the bumper skin, and having an installation groove part formed therein; a pressure transfer tube extended in a lateral direction along the installation groove part; a tube mounting member configured to cover a circumference of the pressure transfer tube, and inserted and installed into the installation groove part; and one or more pressure sensors each connected to an end of the pressure transfer tube and coupled to the pressure sensor installation part.

12 Claims, 11 Drawing Sheets

SECTION A-A'

SECTION A-A'

SECTION B-B'

PEDESTRIAN COLLISION SENSING DEVICE

CROSS-REFERENCE TO RELATED APPLICATION

This application claims priority from and the benefit of Korean Patent Application No. 10-2019-0119636, filed on Sep. 27, 2019, which is hereby incorporated by reference for all purposes as if set forth herein.

BACKGROUND

Field

Exemplary embodiments of the present disclosure relate to a pedestrian collision detection device, and more particularly, to a pedestrian collision detection device which is installed in a vehicle to sense a collision with a pedestrian.

Discussion of the Background

In general, a vehicle has a front bump installed at the front thereof, and the front bump has a pedestrian collision sensing device for sensing a collision with a pedestrian. The pedestrian collision sensing device includes a pressure tube disposed in the front bump so as to extend in a side-to-side direction along the front bump, and a pressure sensor connected to an end of the pressure tube.

In the related art, the pressure tube may be separated from a preset position by vibration, impact or the like, which is applied while the vehicle travels. Furthermore, since the pressure tube has low rigidity, the pressure tube may be frequently damaged during transportation and assembling processes. Furthermore, since the pressure tube and the pressure sensor are installed and applied to a narrow space inside the front bump, it is difficult to secure the ease of the assembling process. Therefore, there is a need for a device capable of solving the problem.

SUMMARY

Various embodiments are directed to a pedestrian collision sensing device which can fasten and install a pressure tube and a pressure sensor at preset positions while improving the ease of an assembling process, and reduce damage to the pressure tube.

In an embodiment, a pedestrian collision sensing device may include: a bumper skin having one or more pressure sensor installation parts formed thereon; a bumper absorber disposed at the rear of the bumper skin, and having an installation groove part formed therein; a pressure transfer tube extended in a lateral direction along the installation groove part; a tube mounting member configured to cover the circumference of the pressure transfer tube, and inserted and installed into the installation groove part; and one or more pressure sensors each connected to an end of the pressure transfer tube and coupled to the pressure sensor installation part.

The pressure sensor installation part may include: one or more pressure sensor mounting parts formed on the rear surface of the bumper skin; one or more nut clips inserted into the pressure sensor mounting parts, respectively, and elastically abutting on both surfaces of the pressure sensor mounting part; and one or more pressure sensor fastening members fastened to the nut clips, respectively, through fastening parts of the pressure sensor and the pressure sensor mounting part.

The pressure sensor mounting part may include: a sensor mounting body part disposed at the rear of a bumper skin body part, and having the nut clip put thereon; a separation connection part configured to connect the sensor mounting body part and the bumper skin body part, and form a clip insertion space part between the bumper skin body part and the sensor mounting body part; and a clip insertion opening part formed on one side of the separation connection part, such that a front portion of the nut clip put onto the sensor mounting body part is inserted into the clip insertion opening part.

The nut clip may include: a front clip part abutting on a front surface of the pressure sensor mounting part; a rear clip part successively formed on the rear surface of the front clip part, and abutting on the rear surface of the pressure sensor mounting part while the gap between the front clip part and the rear clip part is elastically varied; and a nut part formed on the front clip part, such that the pressure sensor fastening member is fastened to the nut part.

The tube mounting member may include: a tube cover part configured to cover the circumference of the pressure transfer tube; one or more insertion parts connected to the tube cover part, and inserted into the installation groove part; and one or more separation prevention bump parts each formed on the insertion part so as to protrude, and locked to the inner surface of the installation groove part.

The installation groove part may include: one or more seating groove parts formed on the bumper absorber so as to be recessed, such that the tube cover part and the insertion part are inserted into the seating groove part; and one or more separation prevention grooves formed on the seating groove parts, respectively, so as to be recessed in the top-to-bottom direction, such that the separation prevention bump is inserted into the separation prevention groove.

The separation prevention bump part may include: one or more first separation prevention bumps formed at an end of the insertion part so as to protrude; and one or more second separation prevention bumps formed at the middle portion of the insertion part so s to protrude, and spaced apart from the first separation prevention bumps, respectively. The separation prevention groove part may include: one or more first separation prevention grooves formed at an end of the seating groove part so as to protrude; and one or more second separation prevention grooves each spaced apart from the first separation prevention groove, such that the second separation prevention bump is inserted into the second separation prevention groove.

The tube mounting member may further include a tube insertion opening part formed on the tube cover part, and constituting a path through which the pressure transfer tube is inserted into the tube cover part.

The pedestrian collision sensing device may further include: a bumper backbeam having an acceleration sensor installation part formed thereon; and an acceleration sensor coupled to the acceleration sensor installation part.

The acceleration sensor installation part may include: one or more acceleration sensor mounting parts formed at the bottom of the bumper backbeam; and one or more acceleration sensor fastening members each fastened to the fastening parts of the acceleration sensor through the acceleration sensor mounting part.

The acceleration sensor mounting part may include: a sensor holding part disposed at the bottom of the backbeam body part; a backbeam coupling part connected to the sensor holding part, and coupled to the backbeam body part; and one or more reinforcement ribs formed between the sensor holding part and the backbeam coupling part so as to protrude, and each having an upper portion connected to the backbeam coupling part and a lower portion connected to the sensor holding part.

The acceleration sensor mounting part may further include one or more locking holes formed through the sensor holding part, such that an elastic protrusion part which is formed on a fastening part of the acceleration sensor and has a variable width is fitted and locked into the locking hole.

In accordance with the embodiment of the present disclosure, the pedestrian collision sensing device having the above-described configuration may be easily applied through a simple assembling process of inserting the tube mounting member into the installation groove part of the bumper absorber, with the circumference of the pressure transfer tube, covered by the tube mounting member and then installing the pressure sensor on the pressure sensor installation part of the bumper skin.

Furthermore, the pressure sensor and the pressure transfer tube are installed on the bumper skin and the bumper absorber, to which an impact force is directly applied when a collision with a pedestrian occurs. Thus, when a collision with a pedestrian is sensed through the pressure senor, the operation reliability of the pressure sensor can be more stably secured.

Furthermore, the pressure transfer may be covered by the tube mounting member such that the pressure transfer tube can be more safely protected from the external environment such as temperature or vibration. Furthermore, since an assembling force applied when the bumper absorber is assembled is mainly applied to the tube mounting member, it is possible to prevent damage to the pressure transfer tube and reduction in sensing performance, caused by the assembling force.

Furthermore, as the tube mounting member is inserted into the installation groove part of the bumper absorber, the installation of the pressure transfer tube may be reliably performed so that the pressure transfer tube is not moved and separated by vibration applied while the vehicle travels. Furthermore, the pressure sensor can be directly coupled to the pressure sensor installation part of the bumper skin with no separate bracket interposed therebetween, which makes it possible to reduce the number of parts and the manufacturing cost.

DETAILED DESCRIPTION OF THE ILLUSTRATED EMBODIMENTS

Hereinafter, a pedestrian collision detection device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
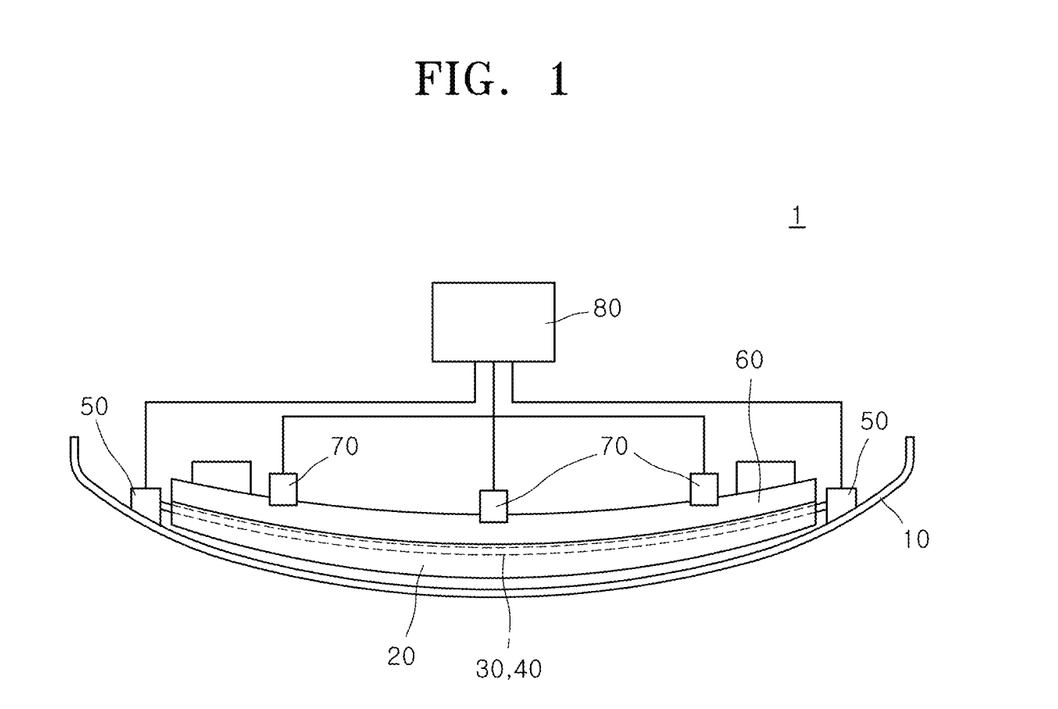
FIG. 1 is a plan view schematically illustrating a pedestrian collision detection device in accordance with an embodiment of the present disclosure.
Figure 2:
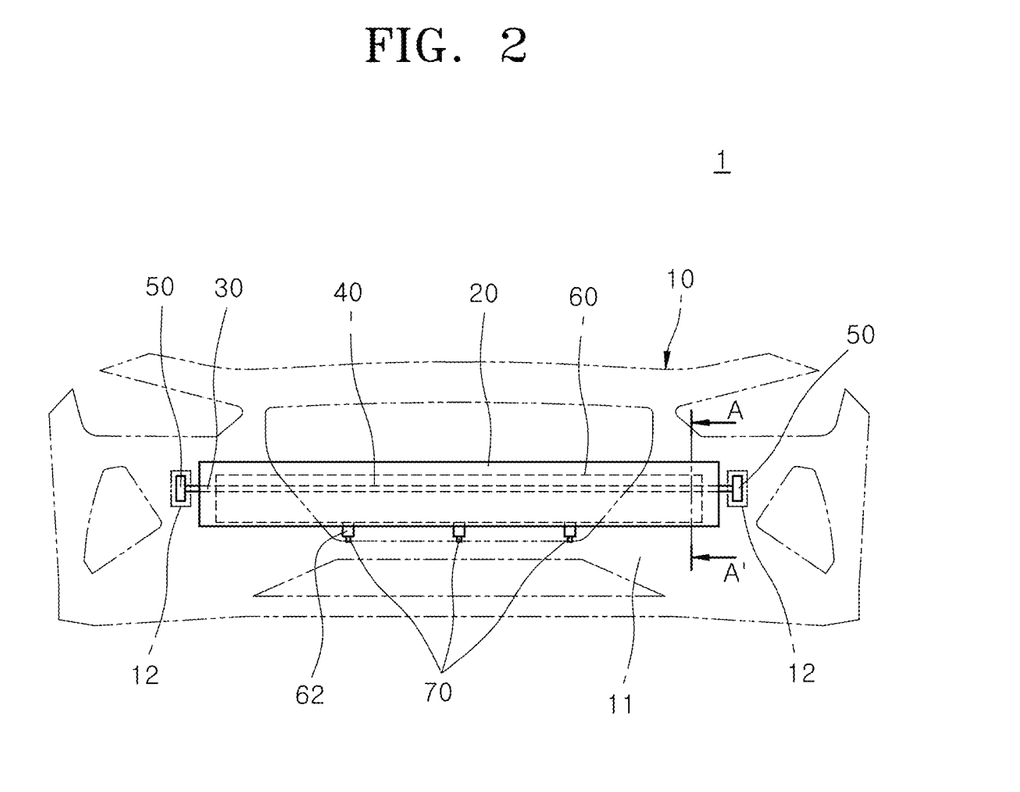
FIG. 2 is a front view schematically illustrating the pedestrian collision detection device in accordance with the embodiment of the present disclosure.
Figure 3:
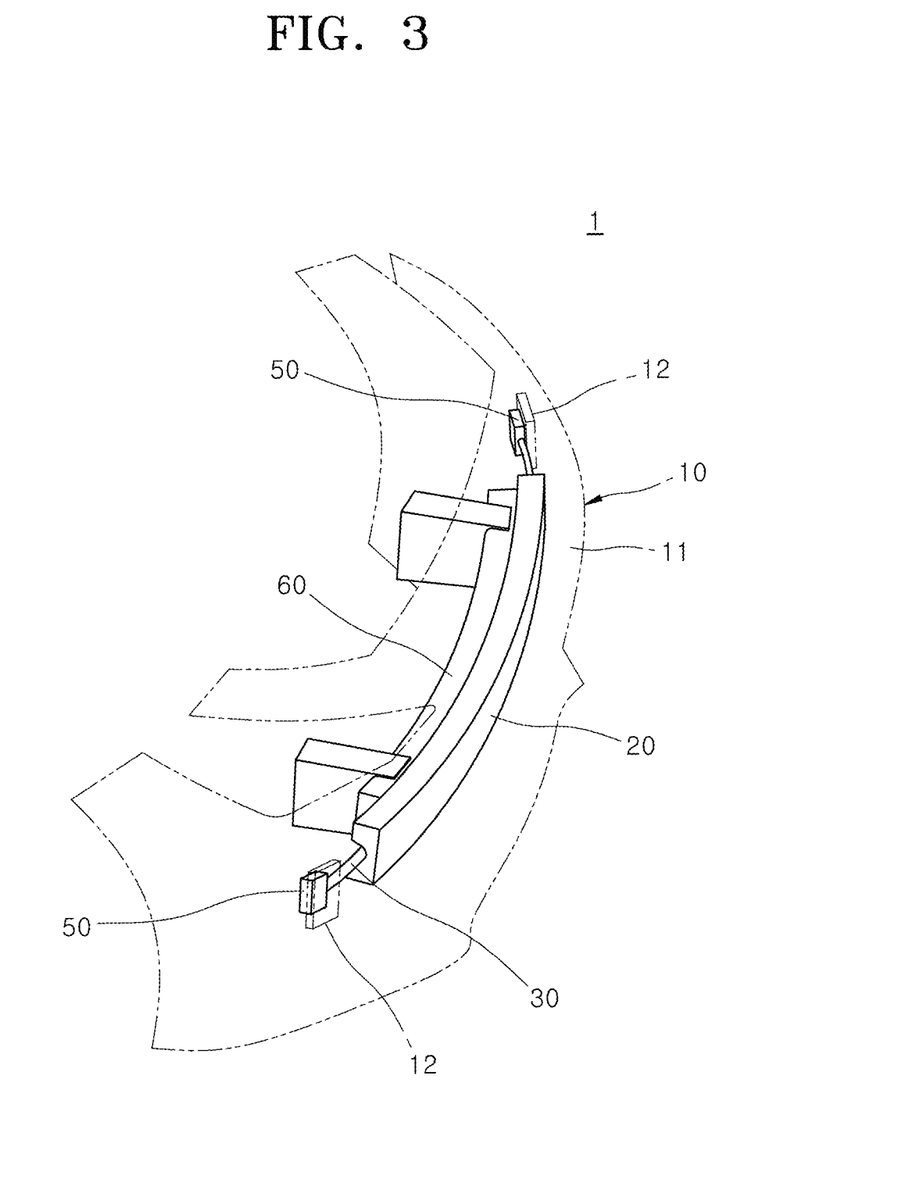
FIG. 3 is a front-side perspective view schematically illustrating the pedestrian collision detection device in accordance with the embodiment of the present disclosure.

FIG. 1 is a plan view schematically illustrating a pedestrian collision detection device in accordance with an embodiment of the present disclosure, FIG. 2 is a front view schematically illustrating the pedestrian collision detection device in accordance with the embodiment of the present disclosure, and FIG. 3 is a front-side perspective view schematically illustrating the pedestrian collision detection device in accordance with the embodiment of the present disclosure.

Referring to FIGS. 1 to 3, the pedestrian collision sensing device 1 in accordance with the embodiment of the present disclosure includes a bumper skin 10, a bumper absorber 20, a pressure transfer tube 30, a tube mounting member 40, a pressure sensor 50, a bumper backbeam 60, an acceleration sensor 70 and a controller 80.

The bumper skin 10, the bumper absorber 20 and the bumper backbeam 60 are parts constituting the main frame of a bumper (with no reference numeral) of the vehicle, and are sequentially disposed from the front (bottom in FIG. 1). The bumper skin 10 constitutes a front portion of the bumper for the vehicle. The bumper absorber 20 is formed of a cushion material such as energy absorption foam, expanded polypropylene or compressed Styrofoam, which can be elastically deformed by an impact transferred from the bumper skin 10, and disposed at the rear of the bumper skin 10. The bumper backbeam 60 is disposed at the rear of the bumper absorber 20, and connected to a frame part (not illustrated) of the vehicle.

The bumper skin 10 has a pressure sensor installation part 12 in which the pressure sensor 50 is installed. The bumper absorber 20 facing the bumper backbeam 60 has an installation groove part 22 formed at the rear surface thereof (see FIG. 5), such that the pressure transfer tube 30 is installed in the installation groove part 22. The pressure transfer tube 30 is extended in the side-to-side direction along the installation groove part 22, and has left and right ends extended to the outside of the bumper absorber 20 and connected to the pressure sensor 50. The pressure transfer tube 30 is formed of synthetic resin such as silicone, which can secure resistance to heat and cold and a semipermanent property, and has air contained therein.

The tube mounting member 40 covers the circumference of the pressure transfer tube 30, and is fitted into the installation groove part 22. The tube mounting member 40 is formed of a cushion material such as rubber or urethane. The pressure transfer tube 30 is installed in the bumper absorber 20 while covered by the tube mounting member 40.

Since the pressure transfer tube 30 is coupled to the tube mounting member 40 and then transported and assembled, the pressure transfer tube 30 may be protected by the tube mounting member 40. Therefore, the pressure transfer tube 30 can be prevented from being damaged when transported or assembled to the bumper absorber 20. Furthermore, the pressure transfer tube 30 can secure robustness to the external environment such as temperature or vibration.

The pressure sensor 50 is connected to the left and right ends of the pressure transfer tube 30 extended to the outside of the installation groove part 22, and coupled to the pressure sensor installation part 12 formed at the rear of the bumper skin 10. The pressure transfer tube 30 is deformed from the initial shape by an impact transferred to the bumper absorber 20. Such a deformation changes the internal pressure of the pressure transfer tube 30. Such a pressure change is transferred to the pressure sensor 50 connected to the end of the pressure transfer tube 30, and the pressure sensor 50 senses the pressure change and transmits the sensed pressure change to the controller 80. The controller 80 receives the signal of the pressure sensor 50, and utilizes the signal as information for determining whether the vehicle collides with a pedestrian.

The bumper backbeam 60 has an acceleration sensor installation part 62 in which the acceleration sensor 70 is installed. The bumper backbeam 60 is connected to the vehicle body (not illustrated) and simultaneously disposed to abut on the rear surface of the bumper absorber 20. As the acceleration sensor 70 is installed on the bumper backbeam 60, the acceleration sensor 70 more sensitively reacts to both an impact force applied to the vehicle body and an impact force applied to the bumper absorber 20, when the vehicle collides with a pedestrian, compared to an embodiment in which the acceleration sensor 70 is installed in the vehicle body.

The plurality of acceleration sensors 70 are installed at positions corresponding to the middle, left and right of the bumper backbeam 60. Therefore, although an impact force is concentrated on one side of the bumper backbeam 60, at least one of the plurality of acceleration sensors 70 senses the impact force. Therefore, it is possible to more stably secure the sensing reliability of the impact force.

An acceleration change sensed by the acceleration sensor 70 is transmitted to the controller 80. The controller 80 receives the signals of the pressure sensor 50 and the acceleration sensor 70, compares the magnitude of the pressure and the acceleration change to reference values according to a preset program, and determines whether the vehicle collides with a pedestrian (not illustrated). When determining that the collision with the pedestrian occurred, the controller 80 controls a pedestrian protection device for protecting a pedestrian. For example, the controller 80 operates an airbag (not illustrated) installed between a bonnet (not illustrated) and a windshield (not illustrated).

Figure 4:
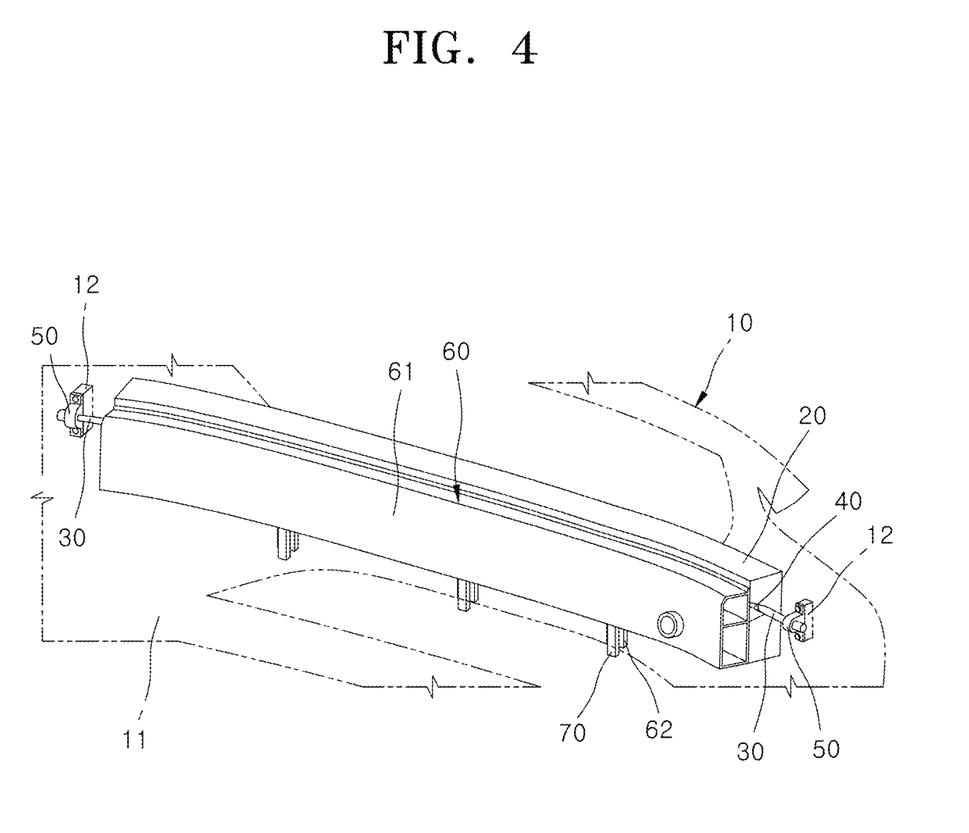
FIG. 4 is a rear perspective view schematically illustrating the pedestrian collision sensing device in accordance with the embodiment of the present disclosure.
Figure 5:
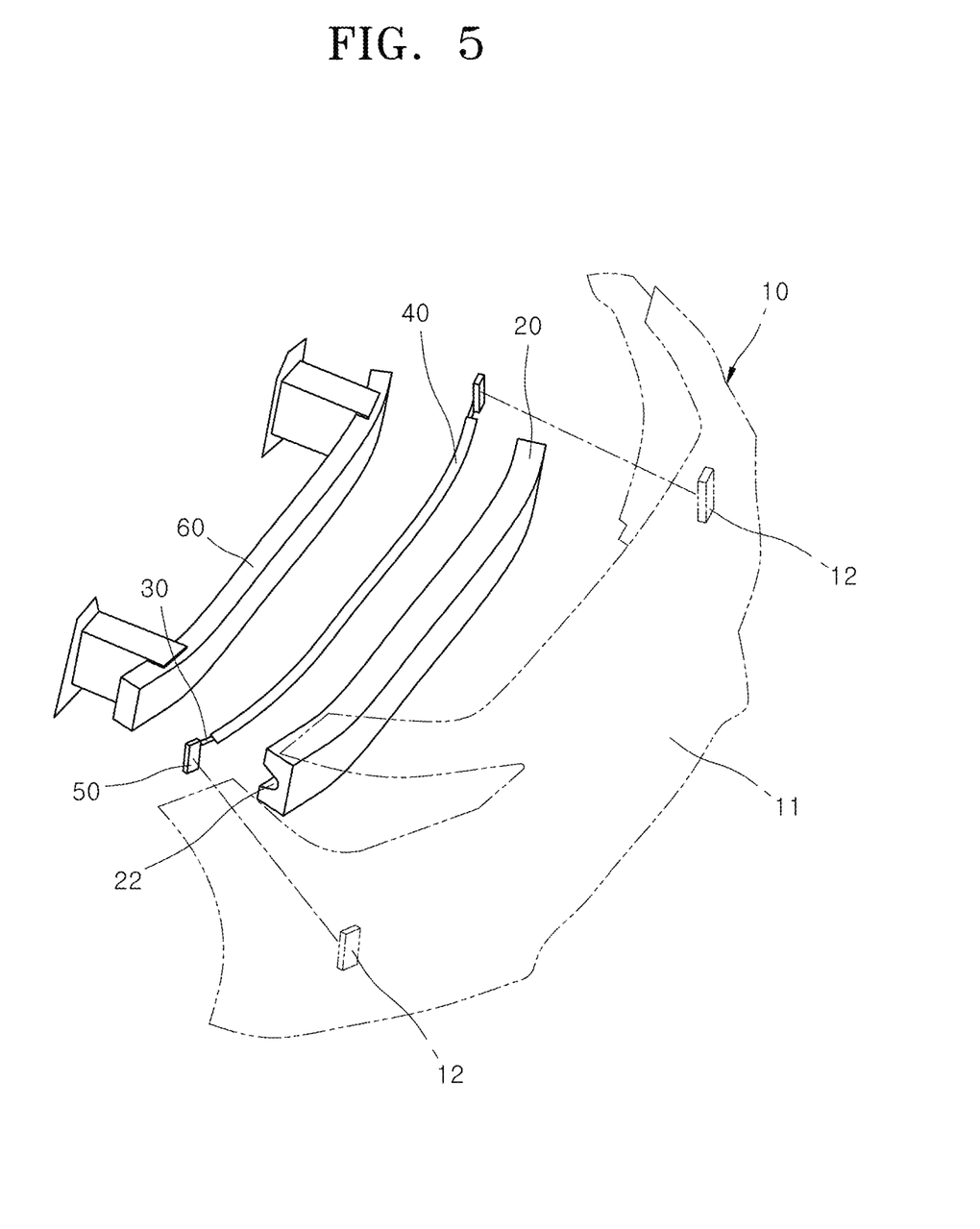
FIG. 5 is an exploded perspective view schematically illustrating the pedestrian collision sensing device in accordance with the embodiment of the present disclosure.
Figure 6:
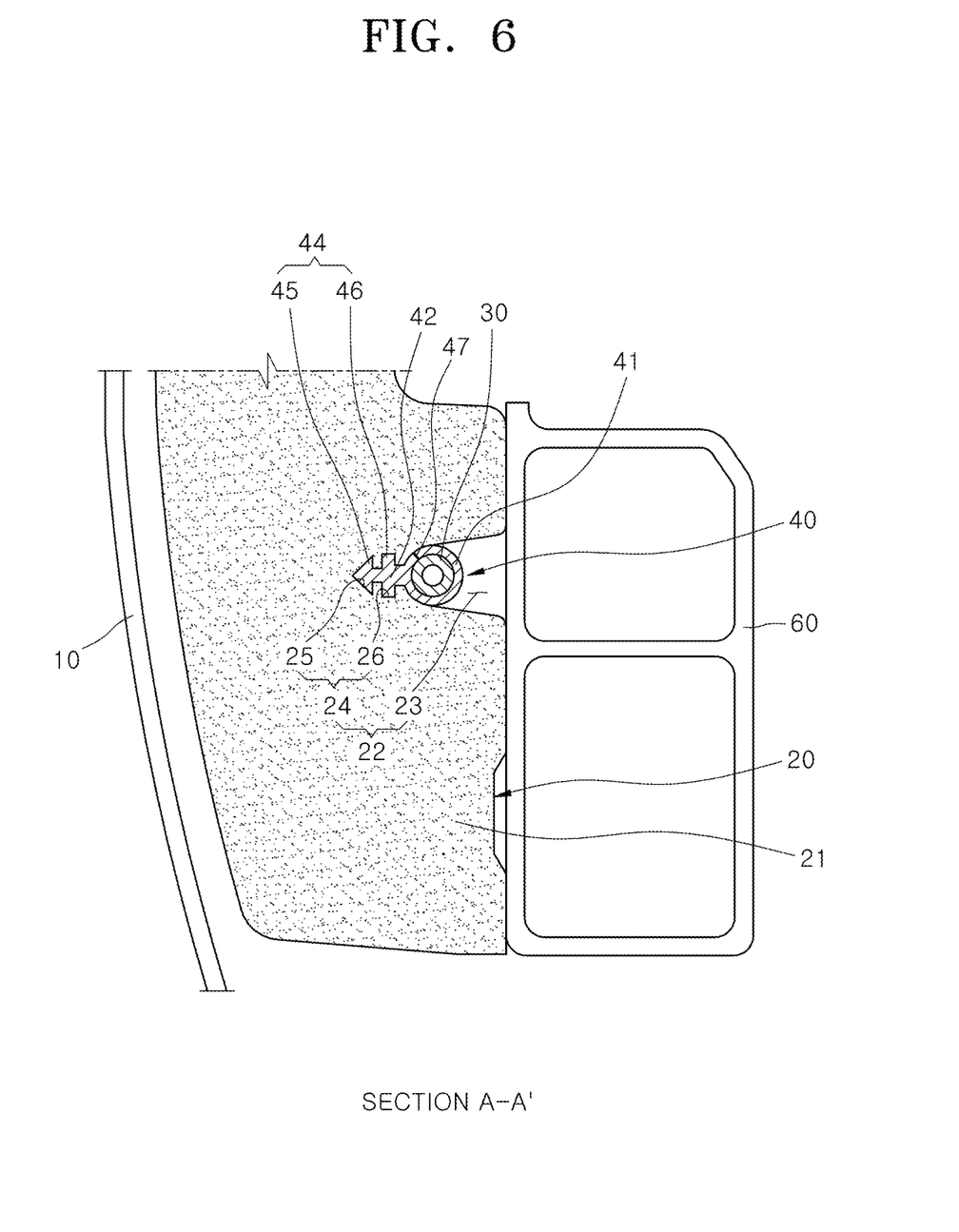
FIG. 6 is a cross-sectional view taken along the line A-A' of FIG. 2.

FIG. 4 is a rear perspective view schematically illustrating the pedestrian collision sensing device in accordance with the embodiment of the present disclosure, FIG. 5 is an exploded perspective view schematically illustrating the pedestrian collision sensing device in accordance with the embodiment of the present disclosure, and FIG. 6 is a cross-sectional view taken along the line A-A' of FIG. 2.

Referring to FIGS. 3 to 5, the bumper skin 10 in accordance with the embodiment of the present disclosure includes a bumper skin body part 11 and the pressure sensor installation part 12.

The bumper skin body part 11 is a part constituting the basic frame of the bumper skin 10, and has a structure corresponding to the existing bumper skin 10. The pressure sensor installation part 12 is formed at the rear surface of the bumper skin body part 11, and has a structure which can fix the pressure sensor 50 by tightening a screw.

Figure 7:
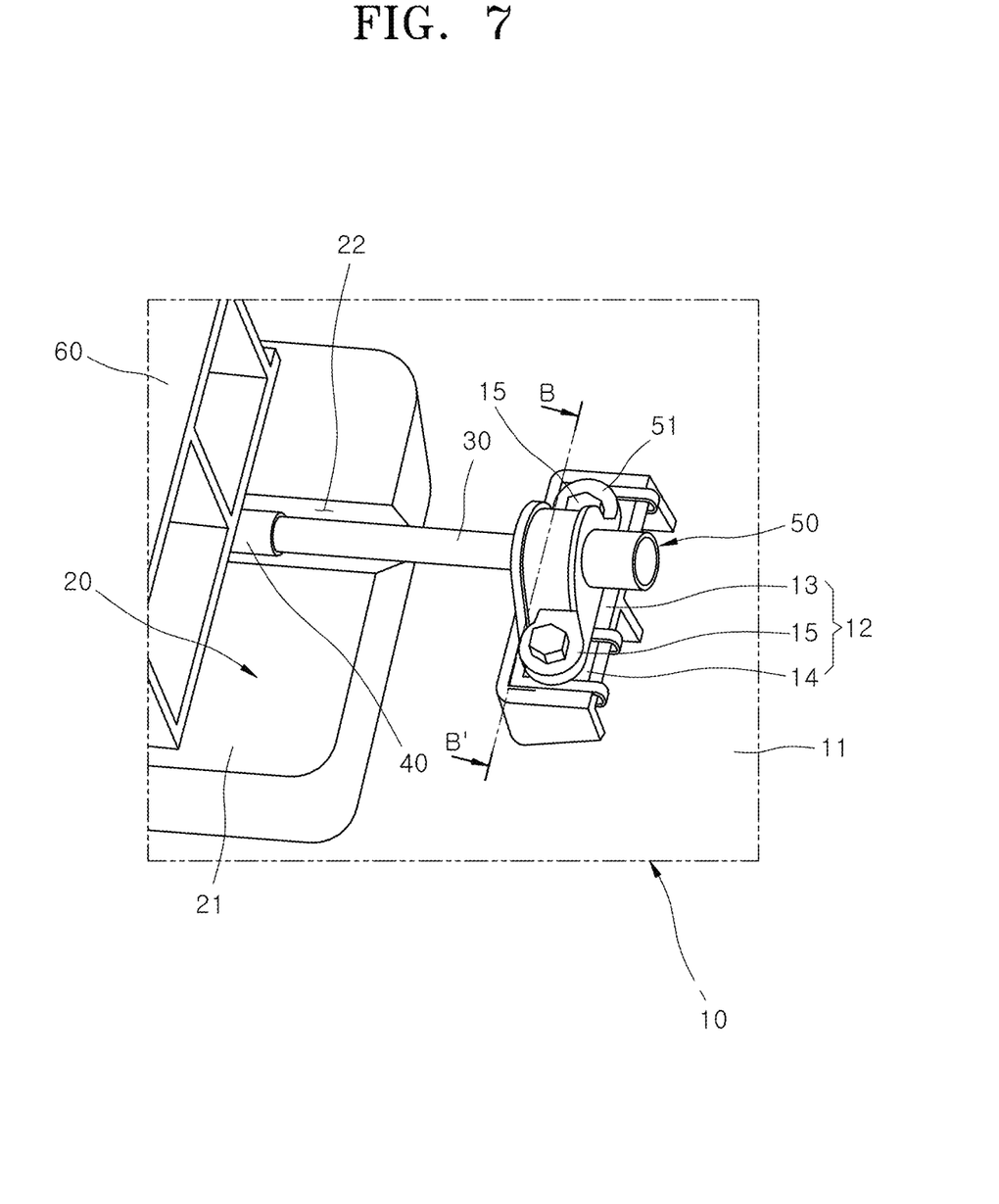
FIG. 7 is a perspective view illustrating an installation structure of the pressure sensor of the pedestrian collision sensing device in accordance with the embodiment of the present disclosure.
Figure 8:
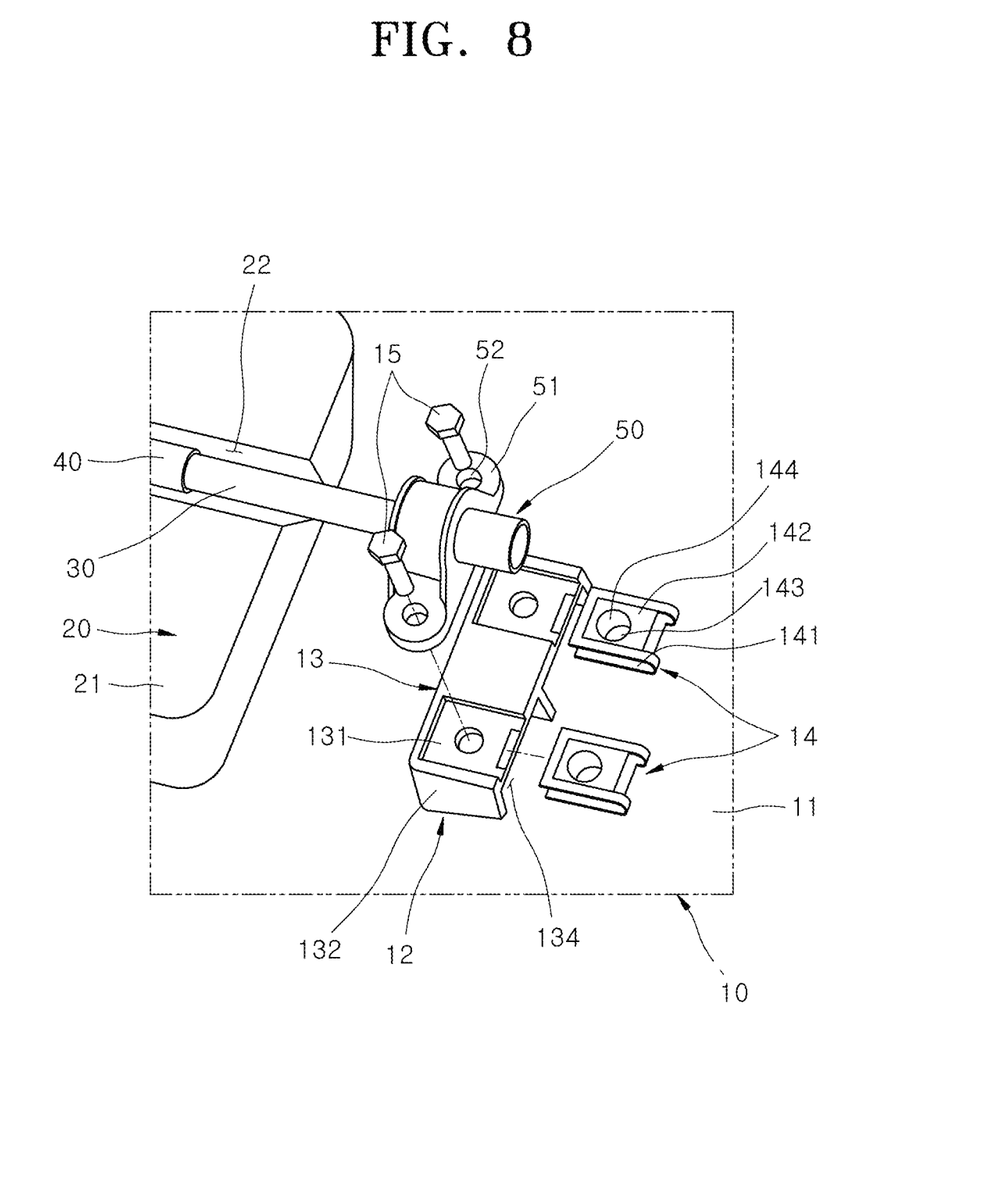
FIG. 8 is an assembled view of FIG. 7.
Figure 9:
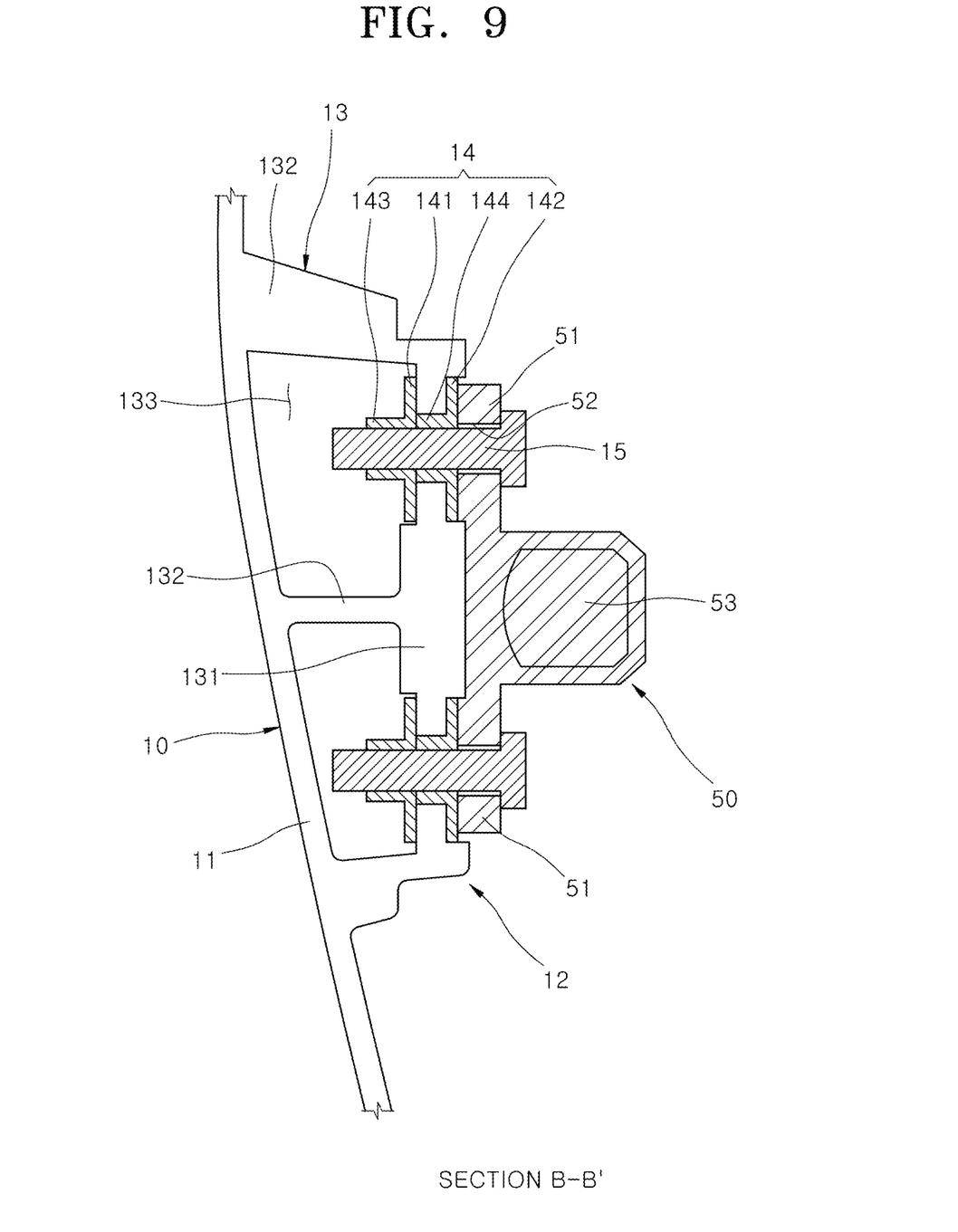
FIG. 9 is a cross-sectional view taken along the line B-B' of FIG. 7.

FIG. 7 is a perspective view illustrating an installation structure of the pressure sensor of the pedestrian collision sensing device in accordance with the embodiment of the present disclosure, FIG. 8 is an assembled view of FIG. 7, and FIG. 9 is a cross-sectional view taken along the line B-B' of FIG. 7.

Referring to FIGS. 7 to 9, the pressure sensor installation part 12 in accordance with the embodiment of the present disclosure includes a pressure sensor mounting part 13, a nut clip 14 and a pressure sensor fastening member 15.

The pressure sensor mounting part 13, on which the pressure sensor 50 is mounted, has a width capable of supporting fastening parts 51 of the pressure sensor 50, formed at the top and bottom of the pressure sensor 50, and is connected to the rear surface of the bumper skin body part 11 as one body. The pressure sensor mounting part 13 in accordance with the embodiment of the present disclosure includes a sensor mounting body part 131, a separation connection part 132 and a clip insertion opening part 134.

The sensor mounting body part 131 has a width corresponding to the pressure sensor 50, and is disposed at the rear of the bump skin body part 11. The nut clip 14 is put onto the sensor mounting body part 131. The separation connection part 132 connects the bumper skin body part 11 to the sensor mounting body part 131 disposed at the rear of the bumper skin body part 11 so as to be spaced apart from the bumper skin body part 11. The separation connection part 132 may be extended along the edge of the sensor mounting body part 131, and formed at the middle portion of the sensor mounting body part 131 in the top-to-bottom direction.

Between the bumper skin body part 11 and the sensor mounting body part 131, a clip insertion space part 133 is formed, into which the front portion of the nut clip 14 can be inserted. The clip insertion opening part 134 is a part constituting a path into which the front portion of the nut clip 14 is inserted, and is formed on one side of the separation connection part 132 so as to communicate with the clip insertion space part 133. The clip insertion opening part 134 in accordance with the embodiment of the present embodiment is formed on the left or right end of the clip insertion space part 133.

The nut clip 14 is formed by bending a metal piece in a U-shape, and put onto the sensor mounting body part 131 of the pressure sensor mounting part 13. With the nut clip 14 put onto the sensor mounting body part 131, front and rear surfaces of the nut clip 14 elastically abut on front and rear surfaces of the sensor mounting body part 131, respectively. The nut clip 14 in accordance with the embodiment of the present disclosure includes a front clip part 141, a rear clip part 142 and nut parts 143 and 144.

The front clip part 141 is elastically brought into surface contact with the front surface of the pressure sensor mounting part 13. The rear clip part 142 is successively formed at the rear of the front clip part 141, and elastically brought into surface contact with the rear surface of the pressure sensor mounting part 13. The front clip part 141 and the rear clip part 142 may be formed as one body by bending one metallic member in a U-shape, and the gap therebetween may be elastically varied.

With the gap between the front clip part 141 and the rear clip part 142, expanded more than the thickness of the sensor mounting body part 131, the nut clip 14 may be pushed so as to be stacked on the sensor mounting body part 131 in the front-to-rear direction, in order to install the nut clip 14. At this time, the front clip part 141 is inserted into the clip insertion space part 133 through the clip insertion opening part 134.

Each of the nut parts 143 and 144 is a part to which the pressure sensor fastening member 15 having a male screw structure is screwed, has a female screw structure, and is connected to at least one of the front clip part 141 and the rear clip part 142. The nut parts 143 and 144 in accordance with the embodiment of the present disclosure are connected to the front portion of the front clip part 141 and the front portion of the rear clip part 142 as one body.

With the nut clip 14 put and mounted onto the pressure sensor mounting part 13, the nut part 143 connected to the front clip part 141 is positioned in the clip insertion space part 133 with the front clip part 141. The nut part 144 connected to the rear clip part 142 abuts on the front clip part 141 through the sensor mounting body part 131. The pair of nut parts 143 and 144 connected to the front clip part 141 and the rear clip part 142, respectively, form a continuous female screw structure extended to the front of the sensor mounting body part 131 through the sensor mounting body part 131.

The pressure sensor 50 includes a pressure sensing part 53 which is capable of sensing pressure and the fastening part 51 of the pressure sensor 50, which is fastened and fixed to the pressure sensor installation part 12. The fastening parts 51 of the pressure sensor 50 are formed at the top and bottom of the pressure sensor 50, and have a fastening hole 52 through which the pressure sensor fastening member 15 can be passed, in the front-to-rear direction.

The pressure sensor fastening member 15 has a male screw structure, and is screwed to the nut parts 143 and 144 through the fastening part 51 of the pressure sensor 50, the rear clip part 142, the sensor mounting body part 131 and the front clip part 141 from the rear of the pressure sensor 50. By the fastening structure between the nut clip 14 and the pressure sensor fastening member 15, the pressure sensor 50 may be reliably fixed and installed on the bumper skin 10.

Referring to FIG. 6, the bumper absorber 20 in accordance with the embodiment of the present disclosure includes an absorber body part 21 and the installation groove part 22.

The absorber body part 21 is a part constituting the basic frame of the bumper absorber 20, and has a structure corresponding to the existing bumper absorber 20. The installation groove part 22 is formed at the rear surface of the absorber body part 21 so as to be recessed to the front, and extended in the side-to-side direction from the left end to the right end of the absorber body part 21. The installation groove part 22 in accordance with the embodiment of the present disclosure includes a seating groove part 23 and a separation prevention groove part 24.

The seating groove part 23 is formed at the rear surface of the bumper absorber 20 so as to be recessed to the front, and a tube cover part 41 and an insertion part 42 of the tube mounting member 40 are inserted into the seating groove part 23. The pressure transfer tube 30 and the tube mounting member 40 are inserted into the seating groove part 23 from the rear of the absorber body part 21.

The front portion of the seating groove part 23 has a smaller width than that of the rear portion thereof. Therefore, the tube mounting member 40 may be easily inserted from the rear of the absorber body part 21, which makes it possible to prevent damage to the tube mounting member 40 and the pressure transfer tube 30, which may occur due to an excessive pressing force.

The separation prevention groove part 24 is part for preventing a separation of the tube mounting member 40, and is formed on the seating groove part 23 so as to be recessed in the top-to-bottom direction, and a separation prevention bump part 44 of the tube mounting member 40 is inserted into the separation prevention groove part 24. As the separation prevention bump part 44 is fitted and locked into the separation prevention groove part 24, the tube mounting member 40 may be stably prevented from moving to the rear and separating, which makes it possible to secure the assembling performance of the tube mounting member 40.

The separation prevention groove part 24 in accordance with the embodiment of the present disclosure has a structure in which a plurality of separation prevention grooves including first and second separation prevention grooves 25 and 26 are disposed to be spaced apart from each other in the front-to-rear direction. The first separation prevention groove 25 is formed at the front of the seating groove part 23 so as to protrude, and the second separation prevention groove 26 is disposed at the rear of the first separation prevention groove 25 so as to be spaced apart from the first separation prevention groove 25.

Referring to FIG. 6, the tube mounting member 40 in accordance with the embodiment of the present disclosure includes the tube cover part 41, the insertion part 42, the separation prevention bump part 44 and a tube insertion opening part 47.

The tube cover part 41 is a part for covering the circumference of the pressure transfer tube 30, and has a length corresponding to the side-to-side length of the bumper absorber 20. The insertion part 42 is formed at the front of the tube cover part 41, and inserted and assembled into the seating groove part 23 of the installation groove part 22. The separation prevention bump part 44 is formed at the top and bottom of the insertion part 42 so as to protrude in the top-to-bottom direction, and inserted and locked into the separation prevention groove part 24.

The separation prevention bump part 44 in accordance with the embodiment of the present disclosure includes a first separation prevention bump 45 and a second separation prevention bump 46. The first separation prevention bump 45 is formed at the front end of the insertion part 42 so as to protrude in the top-to-bottom direction, and inserted into the first separation prevention groove 25. The front end of the insertion part 42 has a shape pointed to the front, and the first separation prevention bump 45 forms an arrow-shaped cross-section indicating the front, with the insertion part 42.

Due to the shapes of the insertion part 42 and the first separation prevention bump 45, the insertion part 42 and the first separation prevention bump 45 may be easily inserted until the insertion part 42 and the first separation prevention bump 45 abut on the front end of the seating groove part 23. Furthermore, the assembling and connection to the installation groove part 22 may be reliably achieved by the first separation prevention bump 45.

The second separation prevention bump 46 is formed at the middle portion of the insertion part 42 so as to protrude in the top-to-bottom direction, and disposed at the rear of the first separation prevention bump 45 so as to be spaced apart from the first separation prevention bump 45. The second separation prevention bump 46 is inserted into the second separation prevention groove 26. The first and second separation prevention bumps 45 and 46 can constrain the movement and separation of the tube mounting member 40 in the front-to-rear direction at multi stages.

The tube insertion opening part 47 is a part constituting a path through which the pressure transfer tube 30 can be inserted into the tube cover part 41, and is formed on the tube cover part 41 and extended in the side-to-side direction across the entire length of the tube cover part 41. The tube insertion opening part 47 in accordance with the embodiment of the present disclosure is formed at the front and top of the tube cover part 41.

With the tube mounting member 40 inserted and assembled into the installation groove part 22, the tube insertion opening part 47 in accordance with the embodiment of the present disclosure is covered by the absorber body part 21 of the bumper absorber 20. Therefore, with the tube mounting member 40 assembled to the bumper absorber 20, an open path through which the pressure transfer tube 30 can be moved and separated to the outside of the tube mounting member 40 may be naturally blocked, and the state in which the pressure transfer tube 30 is fastened to the inside of the tube cover part 41 can be stably maintained.

Figure 10:
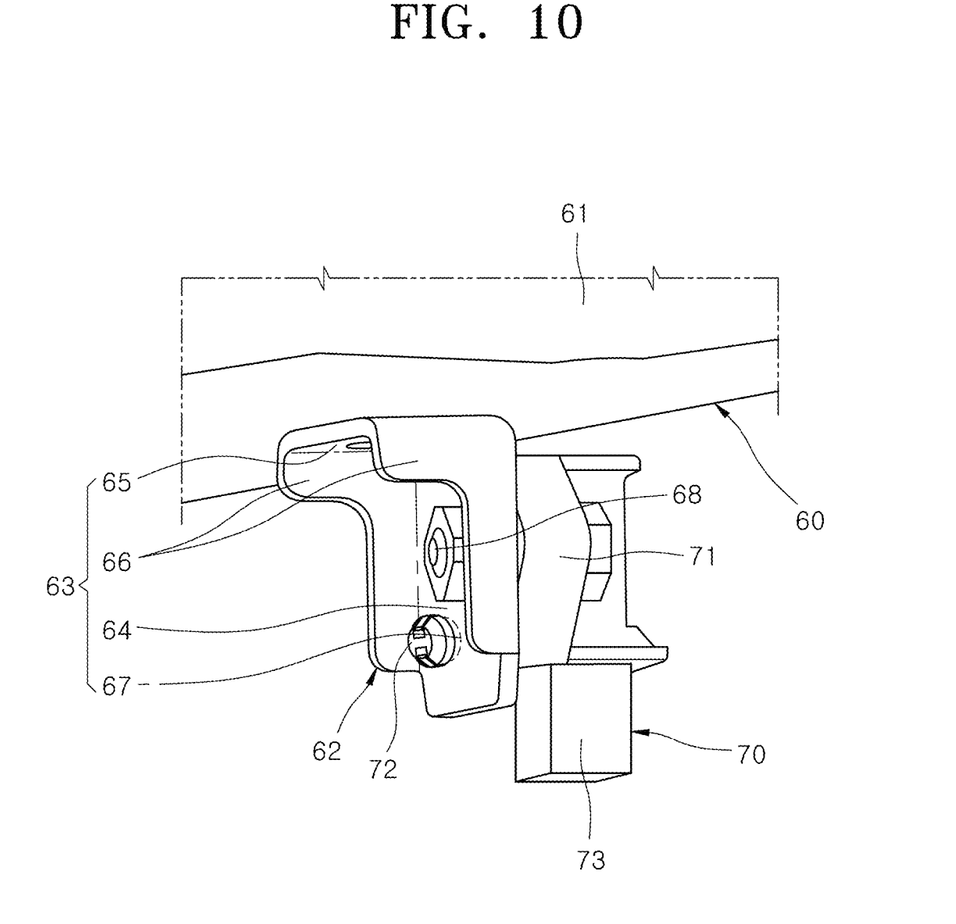
FIG. 10 is a perspective view for describing an installation structure of the acceleration sensor of the pedestrian collision sensing device in accordance with the embodiment of the present disclosure.
Figure 11:
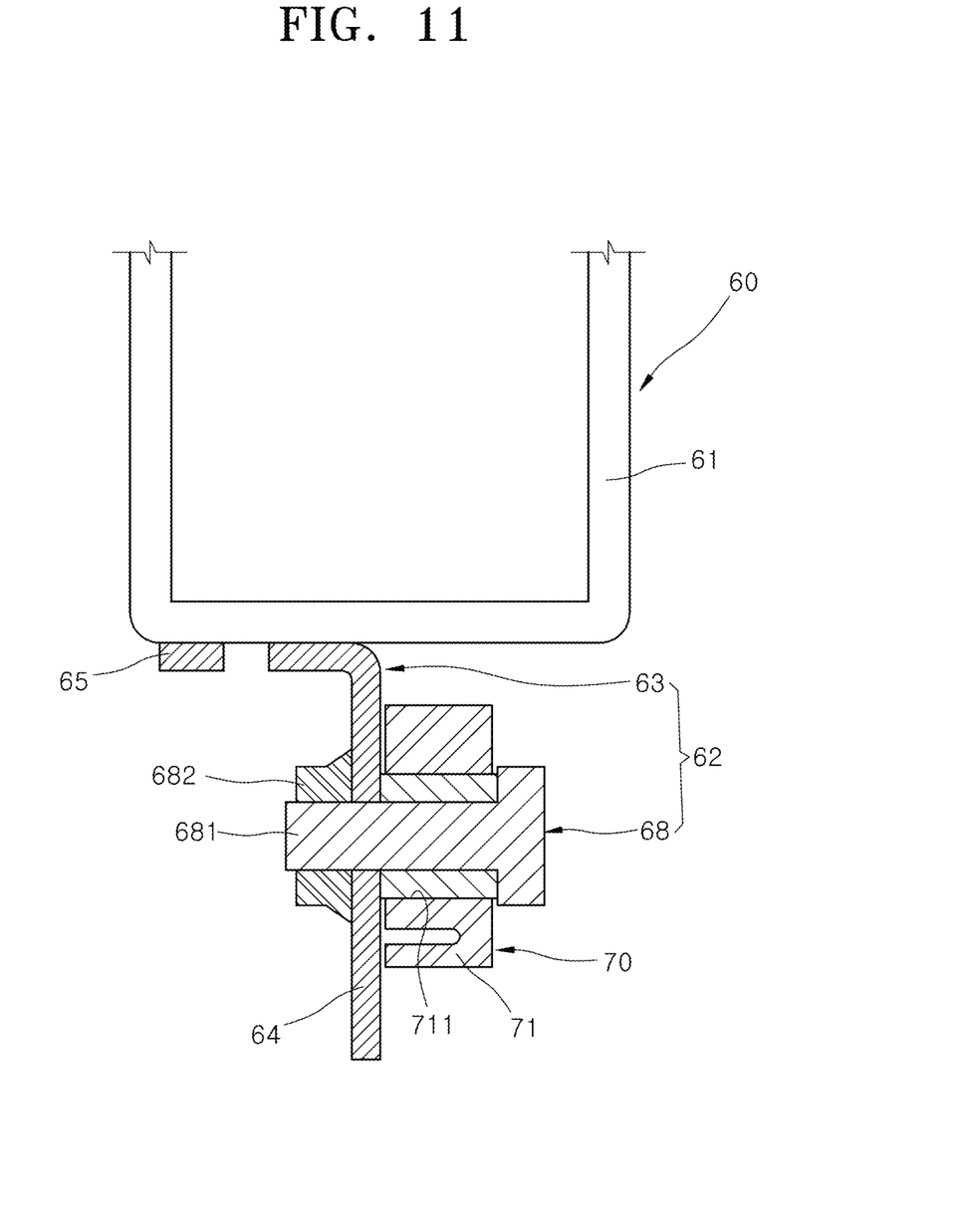
FIG. 11 is a longitudinal cross-sectional view of main parts illustrated in FIG. 10.

FIG. 10 is a perspective view for describing an installation structure of the acceleration sensor of the pedestrian collision sensing device in accordance with the embodiment of the present disclosure, and FIG. 11 is a longitudinal cross-sectional view of main parts illustrated in FIG. 10.

Referring to FIGS. 4, 10 and 11, the bumper backbeam 60 in accordance with the embodiment of the present disclosure includes a backbeam body part 61 and the acceleration sensor installation part 62.

The backbeam body part 61 is a part constituting the basic frame of the bumper backbeam 60, and has a structure corresponding to the existing bumper backbeam 60. The acceleration sensor installation part 62 is coupled to the bottom of the backbeam body part 61, and disposed at a position spaced apart from the middle portion of the backbeam body part 61 in the side-to-side direction, with a preset interval (for example, 260 mm) provided therebetween. The acceleration sensor installation part 62 in accordance with the embodiment of the present disclosure includes an acceleration sensor mounting part 63 and an acceleration sensor fastening member 68.

The acceleration sensor mounting part 63 is a part for providing an installation surface on which the acceleration sensor 70 is mounted and supported, and is coupled to the bottom of the backbeam body part 61. The acceleration sensor mounting part 63 in accordance with the embodiment of the present disclosure includes a sensor holding part 64, a backbeam coupling part 65, a reinforcement rib part 66 and a locking hole part 67.

The sensor holding part 64 is disposed at the bottom of the backbeam body part 61 so as to extend in the top-to-bottom direction. A fastening part 71 of the acceleration sensor 70 is disposed to abut on the rear surface of the sensor holding part 64, and thus set at a preset position in a hollow space (with no reference numeral) formed under the backbeam body part 61. The backbeam coupling part 65 is a part for coupling the acceleration sensor mounting part 63 to the backbeam body part 61, and is formed at the top of the sensor holding part 64 and coupled to the backbeam body part 61 by a connection method such as welding.

The reinforcement rib part 66 is a part for reinforcing the bending stiffness of the sensor holding part 64 and the backbeam coupling part 65, and is formed between the front of the sensor holding part 64 and the bottom of the backbeam coupling part 65 so as to protrude. The reinforcement rib part 66 is extended in an L-shape, and has an upper portion connected to the backbeam coupling part 65 so as to protrude downward and a lower portion connected to the sensor holding part 64 so as to protrude forward.

The acceleration sensor 70 includes an acceleration sensing part 73 which is capable of sensing acceleration and the fastening part 71 of the acceleration sensor 70, which is fastened and fixed to the acceleration sensor installation part 62. The fastening part 71 of the acceleration sensor 70 is formed at the top of the acceleration sensor 70, and has a fastening hole 711 through which the acceleration sensor fastening member 68 can pass in the front-to-rear direction.

Furthermore, the fastening part 71 of the acceleration sensor 70 has an elastic protrusion part 72 formed at the front thereof so as to protrude forward. The elastic protrusion part 72 has a structure in which a plurality of hooks or protrusions (with no reference numerals) which can be elastically bent and deformed are disposed at preset intervals therebetween. As the interval between the respective hooks or protrusions is increased or decreased by an external force, the entire width of the elastic protrusion part 72 is varied. The elastic protrusion part 72 is inserted into the locking hole part 67 formed in the acceleration sensor installation part 62, and snap-fitted into the locking hole part 67.

The locking hole part 67 is formed through the sensor holding part 64 in the front-to-rear direction, and the elastic protrusion part 72 whose width can be varied and which are formed on the fastening part 71 of the acceleration sensor 70 is fitted and locked into the locking hole part 67. Through a simple assembling operation of fitting the elastic protrusion part 72 into the locking hole part 67 from the rear, the fastening part 71 of the acceleration sensor 70 may be connected to a preset position on the sensor holding part 64. In this state, the acceleration sensor fastening member 68 may be easily assembled and fastened. The acceleration sensor fastening member 68 includes a bolt member 681 having a male screw structure and a nut member 682 having a female screw structure. The bolt member 681 is passed through the sensor holding part 64 and the fastening part 71 of the acceleration sensor 70 from the rear, and the nut member 682 is screwed to a front end of the bolt member 681 protruding to the front of the sensor holding part 64. By the above-described fastening structure between the acceleration sensor mounting part 63 and the acceleration sensor fastening member 68, the acceleration sensor 70 may be reliably fixed and installed on the bumper backbeam 60.

The pedestrian collision sensing device 1 having the above-described configuration according to the embodiment of the present disclosure may be easily applied through a simple assembling process of inserting the tube mounting member 40 into the installation groove part 22 of the bumper absorber 20, with the circumference of the pressure transfer tube 30, covered by the tube mounting member 40 and then installing the pressure sensor 50 on the pressure sensor installation part 12 of the bumper skin 10.

Furthermore, in accordance with the embodiment of the present disclosure, the pressure sensor 50 and the pressure transfer tube 30 are installed on the bumper skin 10 and the bumper absorber 20, to which an impact force is directly applied when a collision with a pedestrian occurs. Thus, when a collision with a pedestrian is sensed through the pressure sensor 50, the operation reliability of the pressure sensor 50 can be more stably secured.

According to the embodiment of the present disclosure, the pressure transfer tube 30 may be covered by the tube mounting member 40 such that the pressure transfer tube 30 can be more safely protected from the external environment such as temperature or vibration. Furthermore, since an assembling force applied when the bumper absorber 20 is assembled is mainly applied to the tube mounting member 40, it is possible to prevent damage to the pressure transfer tube 30 and reduction in sensing performance, caused by the assembling force.

Furthermore, as the tube mounting member 40 is inserted into the installation groove part 22 of the bumper absorber 20, the installation of the pressure transfer tube 30 may be reliably performed so that the pressure transfer tube 30 is not moved and separated by vibration applied while the vehicle travels. Furthermore, the pressure sensor 50 can be directly coupled to the pressure sensor installation part 12 of the bumper skin 10 with no separate bracket interposed therebetween, which makes it possible to reduce the number of parts and the manufacturing cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pedestrian collision sensing device comprising:
   a bumper skin having one or more pressure sensor installation parts formed thereon;
   a bumper absorber disposed at a rear of the bumper skin, and having an installation groove part formed therein;
   a pressure transfer tube extended in a lateral direction along the installation groove part;
   a tube mounting member configured to cover a circumference of the pressure transfer tube, and inserted and installed into the installation groove part; and
   one or more pressure sensors each connected to an end of the pressure transfer tube and coupled to the pressure sensor installation part.

2. The pedestrian collision sensing device of claim 1, wherein the pressure sensor installation part comprises:
   one or more pressure sensor mounting parts formed on a rear part of the bumper skin;
   one or more nut clips inserted into the pressure sensor mounting parts, respectively, and elastically abutting on both surfaces of the pressure sensor mounting part; and
   one or more pressure sensor fastening members fastened to the nut clips, respectively, through a fastening part of the pressure sensor and the pressure sensor mounting part.

3. The pedestrian collision sensing device of claim 2, wherein the pressure sensor mounting part comprises:
   a sensor mounting body part disposed at a rear of a bumper skin body part, and having the nut clip put thereon;
   a separation connection part configured to connect the sensor mounting body part and the bumper skin body part, and form a clip insertion space part between the bumper skin body part and the sensor mounting body part; and
   a clip insertion opening part formed on one side of the separation connection part, such that a front portion of the nut clip put onto the sensor mounting body part is inserted into the clip insertion opening part.

4. The pedestrian collision sensing device of claim 2, wherein the nut clip comprises:
   a front clip part abutting on a front surface of the pressure sensor mounting part;
   a rear clip part successively formed on the rear surface of the front clip part, and abutting on a rear surface of the pressure sensor mounting part while the gap between the front clip part and the rear clip part is elastically varied; and
   a nut part formed on the front clip part, such that the pressure sensor fastening member is fastened to the nut part.

5. The pedestrian collision sensing device of claim 1, wherein the tube mounting member comprises:
   a tube cover part configured to cover the circumference of the pressure transfer tube;
   one or more insertion parts connected to the tube cover part, and inserted into the installation groove part; and
   one or more separation prevention bump parts each formed on the insertion part so as to protrude, and locked to an inner surface of the installation groove part.

6. The pedestrian collision sensing device of claim 5, wherein the installation groove part comprises:
   one or more seating groove parts formed on the bumper absorber so as to be recessed, such that the tube cover part and the insertion part are inserted into the seating groove part; and
   one or more separation prevention grooves formed on the seating groove parts, respectively, so as to be recessed in the top-to-bottom direction, such that the separation prevention bump is inserted into the separation prevention groove.

7. The pedestrian collision sensing device of claim 6, wherein the separation prevention bump part comprises:
   one or more first separation prevention bumps formed at an end of the insertion part so as to protrude; and
   one or more second separation prevention bumps formed at a middle portion of the insertion part so as to protrude, and spaced apart from the first separation prevention bumps, respectively,
   wherein the separation prevention groove part comprises:
   one or more first separation prevention grooves formed at an end of the seating groove part so as to protrude; and
   one or more second separation prevention grooves each spaced apart from the first separation prevention groove, such that the second separation prevention bump is inserted into the second separation prevention groove.

8. The pedestrian collision sensing device of claim 5, wherein the tube mounting member further comprises a tube insertion opening part formed openly on the tube cover part, and constituting a path through which the pressure transfer tube is inserted into the tube cover part.

9. The pedestrian collision sensing device of claim 1, further comprising:
   a bumper backbeam having an acceleration sensor installation part formed thereon; and
   an acceleration sensor coupled to the acceleration sensor installation part.

10. The pedestrian collision sensing device of claim 9, wherein the acceleration sensor installation part comprises:

one or more acceleration sensor mounting parts formed at a lower part of the bumper backbeam; and one or more acceleration sensor fastening members fastened through a fastening part of the acceleration sensor and the acceleration sensor mounting part.

11. The pedestrian collision sensing device of claim 10, wherein the acceleration sensor mounting part comprises:

a sensor holding part disposed under the bumper backbeam;

a backbeam coupling part connected to the sensor holding part, and coupled to the bumper backbeam; and one or more reinforcement ribs formed between the sensor holding part and the backbeam coupling part so as to protrude, and each having an upper portion connected to the backbeam coupling part and a lower portion connected to the sensor holding part.

12. The pedestrian collision sensing device of claim 11, wherein the acceleration sensor mounting part further comprises one or more locking holes formed through the sensor holding part, such that an elastic protrusion part which is formed on the fastening part of the acceleration sensor and has a variable width is fitted and locked into the locking hole.

\* \* \* \* \*